United States Patent
Asfaw et al.

(10) Patent No.: US 11,877,126 B2
(45) Date of Patent: *Jan. 16, 2024

(54) INDUCTIVE EXCURSION SENSING FOR AUDIO TRANSDUCERS

(71) Applicant: Google LLC, Mountain View, CA (US)

(72) Inventors: Michael Asfaw, Santa Monica, CA (US); Chad Georges Seguin, Campbell, CA (US); David C. Breece, III, Palo Alto, CA (US); Leonardo Kusumo, San Jose, CA (US)

(73) Assignee: Google LLC, Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/473,266

(22) Filed: Sep. 13, 2021

(65) Prior Publication Data
US 2021/0409884 A1    Dec. 30, 2021

Related U.S. Application Data

(63) Continuation of application No. 16/753,609, filed as application No. PCT/US2018/065778 on Dec. 14, 2018, now Pat. No. 11,146,900.
(Continued)

(51) Int. Cl.
*H04R 29/00* (2006.01)
*G01D 5/20* (2006.01)

(52) U.S. Cl.
CPC ......... *H04R 29/001* (2013.01); *G01D 5/2066* (2013.01)

(58) Field of Classification Search
CPC ... H04R 29/001; H04R 29/003; G01D 5/2066
USPC ... 381/59, 58, 185, 400, 401, 406, 184, 186, 381/384; 330/307; 349/67; 439/329; 361/749, 748
See application file for complete search history.

(56) References Cited

U.S. PATENT DOCUMENTS

| 7,260,229 B2 | 8/2007 | Hlibowicki |
| 8,194,869 B2 * | 6/2012 | Mihelich .............. H04R 29/001 381/59 |

(Continued)

FOREIGN PATENT DOCUMENTS

| CN | 106028235 | 10/2016 |
| CN | 107211218 | 9/2017 |

(Continued)

OTHER PUBLICATIONS

Claussen, Translation of DE102008017054A1, "Method for reducing distortions in sound reproduction of loudspeaker, involves feeding audio input signal by moving coil, where position of moving coil is continuously measured", 2009 (Year: 2009).
(Continued)

*Primary Examiner* — Vivian C Chin
*Assistant Examiner* — Con P Tran
(74) *Attorney, Agent, or Firm* — Fish & Richardson P.C.

(57) ABSTRACT

Techniques, methods, systems, and other mechanisms for measuring the excursion of a speaker while being actively driven. Measuring excursion can involve attaching a flexible printed coil (FPC), including a sense coil, to the speaker, and monitoring an induced current as produced though the sense coil, and further detecting that violation of an excursion limit for the speaker may likely occur.

20 Claims, 5 Drawing Sheets

Related U.S. Application Data (60) Provisional application No. 62/599,570, filed on Dec. 15, 2017.

(56) References Cited

U.S. PATENT DOCUMENTS

| | | |
|---|---|---|
| 9,473,851 B2 | 10/2016 | Galal et al. |
| 9,681,228 B2 | 6/2017 | Wilk et al. |
| 2005/0025317 A1 | 2/2005 | Fedigan |
| 2014/0241536 A1 | 8/2014 | Adams et al. |

FOREIGN PATENT DOCUMENTS

| | | |
|---|---|---|
| DE | 102008017054 | 10/2009 |
| JP | S5672599 | 6/1981 |
| WO | WO 2016/082046 | 6/2016 |
| WO | WO 2017/198274 | 11/2017 |

OTHER PUBLICATIONS

CN Office Action in Chinese Application No. 201880033704.5, dated Sep. 27, 2020, 22 pages (with English translation).
EP Office Action in European Appln. No. 18830631.0, dated Mar. 16, 2021, 7 pages.
PCT International Preliminary Report on Patentability in International Application No. PCT/US2018/065778, dated Jun. 16, 2020, 9 pages.
PCT International Search Report and Written Opinion in International Appln. No. PCT/US2018/065778, dated Mar. 14, 2019, 14 pages.
Office Action in European Appln. No. 18830631.0, dated May 10, 2022, 6 pages.
Office Action in European Appln. No. 18830631.0, dated Oct. 13, 2023, 6 pages.

\* cited by examiner

INDUCTIVE EXCURSION SENSING FOR AUDIO TRANSDUCERS

CROSS-REFERENCE TO RELATED APPLICATION

This application is a continuation of U.S. application Ser. No. 16/753,609, filed Apr. 3, 2020, which is a National Stage Application under 35 U.S.C. § 371 and claims the benefit of International Application No. PCT/US2018/065778, filed Dec. 14, 2018, which claims priority to U.S. Application No. 62/599,570, filed Dec. 15, 2017, the disclosure of which is incorporated herein by reference.

BACKGROUND

Many electronic devices are capable of presenting multimedia content by including speakers which provide tonal, voice-generated, or recorded output. Some speakers are designed to have a smaller physical size for simple integration into various electronic devices having a range of different sizes (e.g., mobile phones, smart home devices). Generally, speakers are associated with a limited distance that the membrane of the speaker can freely move before coming into contact with a barrier (e.g., top plate, yoke). In some cases, such as driving the speaker to reproduce lower frequency sound (e.g., less than resonate frequency of the transducer), a vibrating membrane may experience movement that reaches the threshold of this limited distance (also referred to as excursion or excursion range). A speaker that is being driven past this excursion constraint may produce a degraded quality of audio output (e.g., rubbing and buzzing associated with collision of the membrane). Additionally, physical damage to the speaker itself can be caused due to exceeding the excursion range, or other related factors. Small speakers, such as microspeakers, have a more restricted excursion range (in relation to larger sized speakers), as a result of limited size, and may be more susceptible to the effects of operating beyond the excursion limits.

SUMMARY

This document describes techniques, methods, systems, and other mechanisms for measuring the excursion of a speaker while being actively driven. Measuring excursion can involve attaching a flexible printed coil (FPC), including a sense coil, to the speaker, and monitoring an induced current as produced though the sense coil, and further detecting that a violation of an excursion limit for the speaker may likely occur.

Particular implementations of the disclosed technology can, in certain instances, realize one or more of the following advantages. The technology described in this disclosure involves employing an excursion measuring component which, through induction, produces an electrical signal that is monitored to determine an active excursion distance related to the speaker while actuating. Thus, the technology enables an electronic device to dynamically detect that a speaker is operating at a level that is causing an atypical excursion of the voice coil, for example, that may result in an unintended impact (e.g., degrading audio quality or damaging the speaker). This approach can achieve improved accuracy in comparison to techniques that involve estimating and/or modeling for the excursion distance. For instance, some techniques which measures various non-linear parameters (e.g., voltage across the speaker, current through the voice coil) of the speaker to approximate excursion may be less accurate as the speaker oscillates farther from its initial resting position and the behavior of the parameters, in turn, become more non-linear. Moreover, configuring a speaker to include an excursion measuring component, which can be implemented as a sense coil printed onto a flexible printed circuit, can eliminate the need to add more complex mechanical or processing components to the electronic device intended to perform excursion detection/compensation functions. As such, the disclosed techniques can involve various advantages, such as a reduction in size and/or a reduction in cost of the electronic device in comparison to alternative mechanisms.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
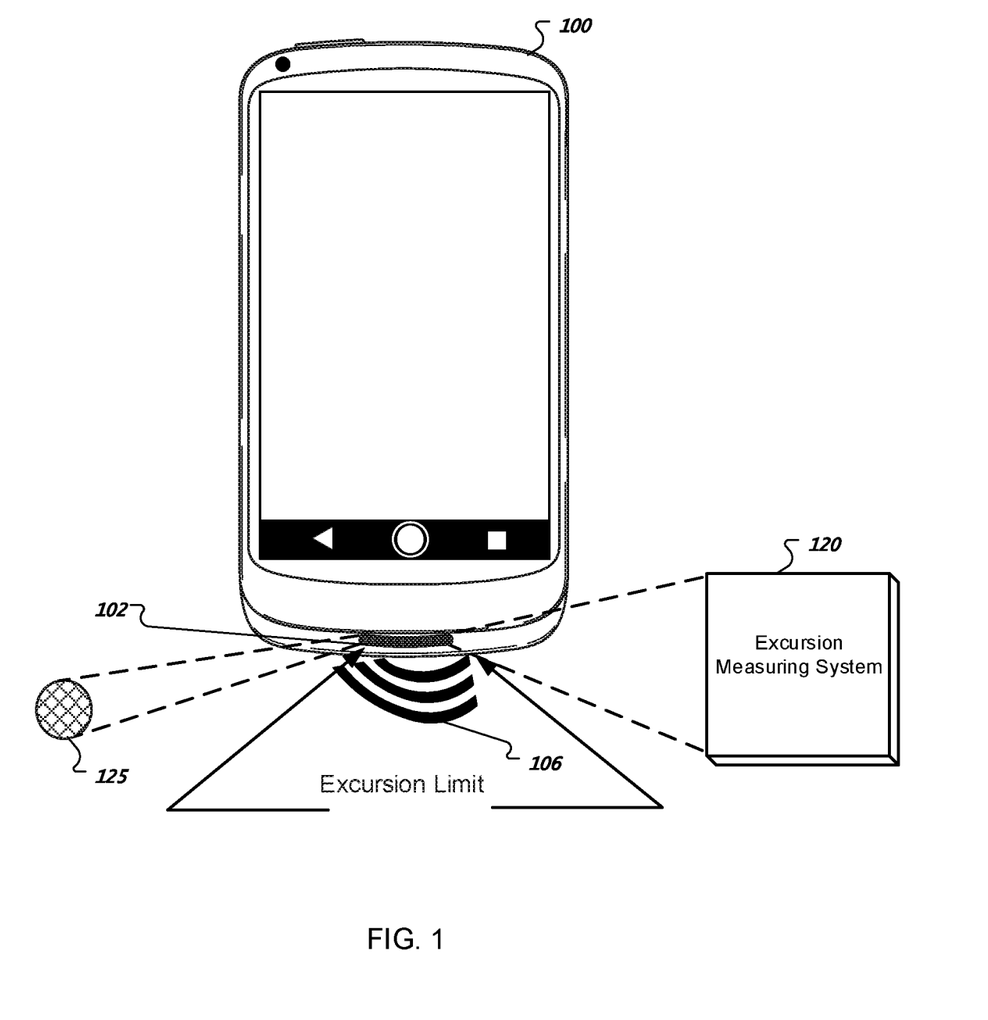
FIG. 1 is a diagram of an electronic device that includes components configured to measure excursion that may be experienced by a speaker at low frequency levels.

FIG. 1 is a diagram of an electronic device 100, e.g., a mobile phone as depicted, that includes a speaker 102 and a system 120 for measuring an excursion of one or more components of speaker 102, e.g., at low frequency levels. During operation, electronic device 100 uses speaker 102 to generate audible sound for a user. Such sound may include sound from voice telephone calls, may include recorded sound (e.g., voice messages, music files, etc.) and may also include sound generated by applications operating on electronic device 100.

Speaker 102 includes an electroacoustic transducer, which converts an electrical audio signal into a corresponding sound. Although FIG. 1 shows speaker 102 as internal component of electronic device 100, it should be appreciated that speaker 102 can also be implemented as an external and/or independent device. For instance, speaker 102 can be a stand-alone micro-speaker that communicates with electronic device 100 using a wireless technology standard, such as Bluetooth, to output audio generated from the electronic device 100. For purposes of discussion, speaker 102 and the excursion measurement techniques are discussed in reference to micro-speakers. However is should be appreciated that the techniques are applicable to larger scale transducers, such as home speakers, automotive speakers, and the like.

As shown, speaker 102 has membrane 125 located over at least one surface. Membrane 125 can be a thin sheet of a semi-rigid material that transmits sound while serving as a barrier to prevent liquids, such as water, from entering into the speaker 102 and potentially damaging its electrical components. FIG. 1 also illustrates an example of excursion associated with the speaker 102 and a physical position of membrane 125. In the example, the excursion limit is shown as the distance of spacing between the membrane 125 and a surface of the electronic device 100 that may serve as a front plate, or partial covering for speaker 102. In some cases, this distance is approximately measured in millimeters, such as 0.5 mm. Accordingly, outward movement of the membrane 125 is physically prevented from displacement beyond that front surface and, in this case, the excursion limit is a physical constraint defined by the mechanical configuration of the speaker 102. That is, the membrane 125 is prevented from reaching the full range of its motion in one direction, due to placement. Although not shown in FIG. 1, the membrane 125 may also be associated with an excursion limit in the opposite direction, related to moving inwards towards other elements of the speaker 102. As a result, the excursion measuring system 120 is configured to measure positive excursion (e.g., +x-axis direction), negative excursion (e.g., −x-axis direction), or both. In some embodiments, the techniques consider excursion from an initial resting position, also referred to as DC level, or the zero position of the transducer.

In some cases, the speaker 102 may be driven under various low frequency and high pressure conditions that can cause the membrane 125 to oscillate farther, having greater displacement, and potentially contacting the surface of the electronic device 100. In the case of high pressure, the pressure level output can be directly related to the amount of air volume displacement. Higher pressure, may displace the membrane 125, for example, pushing the membrane 125 outward due to the pressure inside of the speaker 102 being greater than the pressure outside of the device.

As some background regarding speaker operation, a membrane 125 or diaphragm of a speaker 102 oscillates to produce sound waves in the air and therefore to make noise. It does so by oscillating back and forth past a determinable center location, which may be the same as the location at which the membrane 125 is at rest when no electrical signal is being provided to the speaker 102 (and when the pressure on both sides of the membrane are equal). In the case of lower frequencies, as illustrated in FIG. 1, the speaker 102 can output the audio signals 106 associated with a low frequency. As such, when an oscillating electrical signal at a lower frequency is applied to the speaker 102, the speaker membrane 125 may experience larger oscillations. The membrane 125 can be pushed farther outwards due to displacing larger volumes of air in order to produce audio signals 106 having the lower audible tones (e.g., bass). In other words, a signal at a higher frequency that would not typically cause a speaker 102 to reach the limits of its movement in any given direction, may hit such a limit due to the speaker membrane 125 being pushed in the direction due to air displace across the speaker membrane 125. As a result, the membrane 125 can begin to hit the limits of its ability to extrude in that direction as an audio output is being played. This contact between the membrane 125 and the top surface can result in audible distortion of the audio output 106 to the user, such as a buzz that can be heard while playing bass.

In order to remedy the degradation of the audio signal 106 that may result from excursion related factors, speaker 102 includes excursion measuring system 120. This system 120 can include electronics configured to determine an active excursion distance of an element while the speaker 102 is actuated, and to subsequently detect whether continuing to drive the speaker 102 may violate any known excursion limit constraints. In reference to FIG. 1, the measured excursion distance can be the current position of the membrane 125 in relation to movement within the free space for the excursion limit. For instance, the excursion measuring system 120 can measure that the membrane 125 is located at a 0.4 mm distance, within a 0.5 mm excursion space (e.g., 0.1 mm distance from the top surface). Then, based on the measurement, the excursion measuring system 120 can further detect that the speaker 102 has reached or exceeded a threshold corresponding to acceptable excursion distances (e.g., no audible distortion or device damage). Optionally, in some embodiments, the excursion measuring system 120 can also perform actions allowing the speaker 102 to compensate for any such displacement (e.g., reduce gain, activate compressor).

As a general description, the excursion measuring system 120 includes an excursion measuring component that is implemented as a sense coil. The system 120 monitors an electrical signal produced by a magnetic field that is inductively coupled to the sense coil in order to measure an excursion distance. The excursion measuring techniques and system are discussed in greater detail in reference to FIGS. 2A-2B.

Figure 2A:
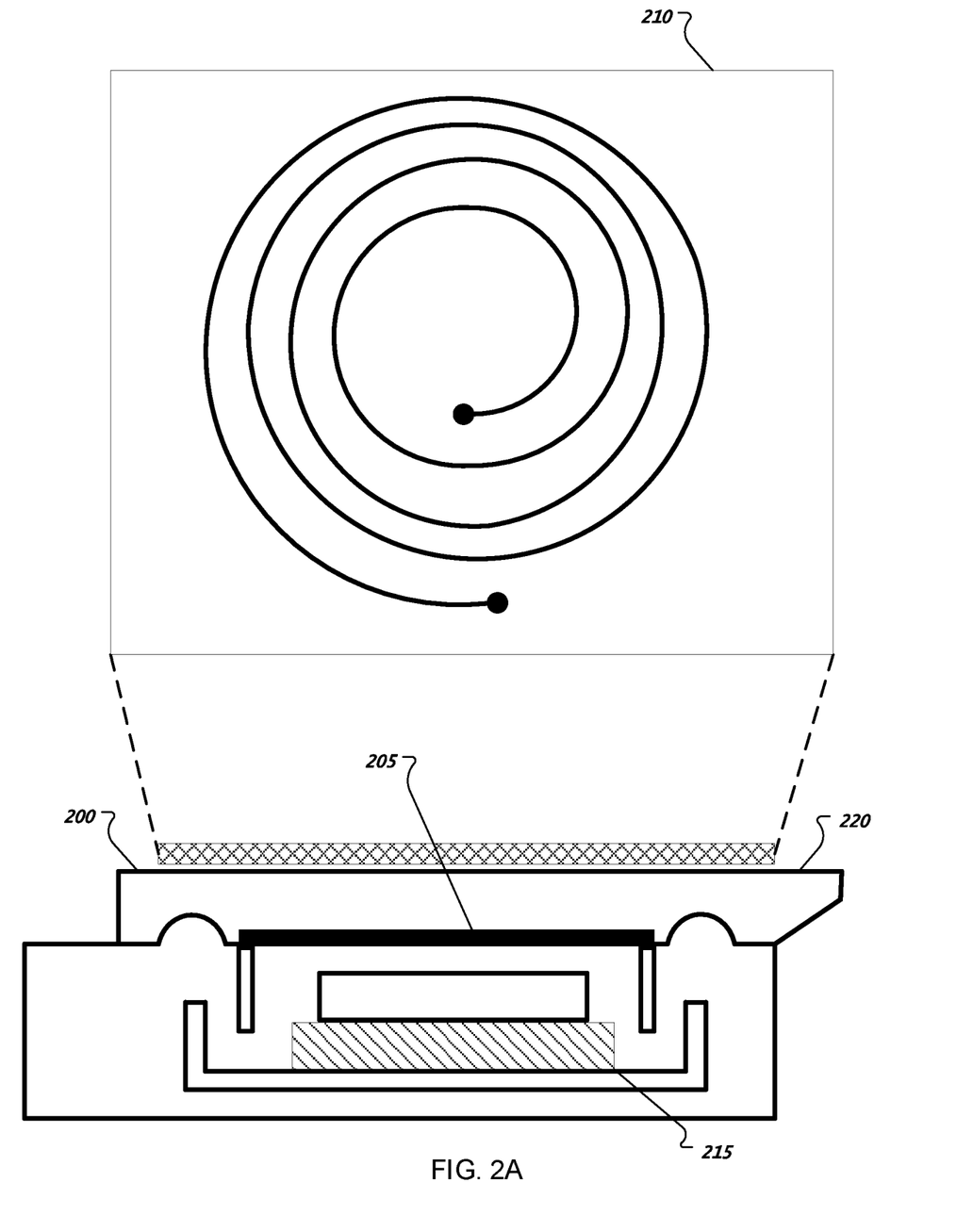
FIGS. 2A-2B are schematic diagrams of a speaker including an excursion measuring component that may implement the disclosed technology.
Figure 2B:
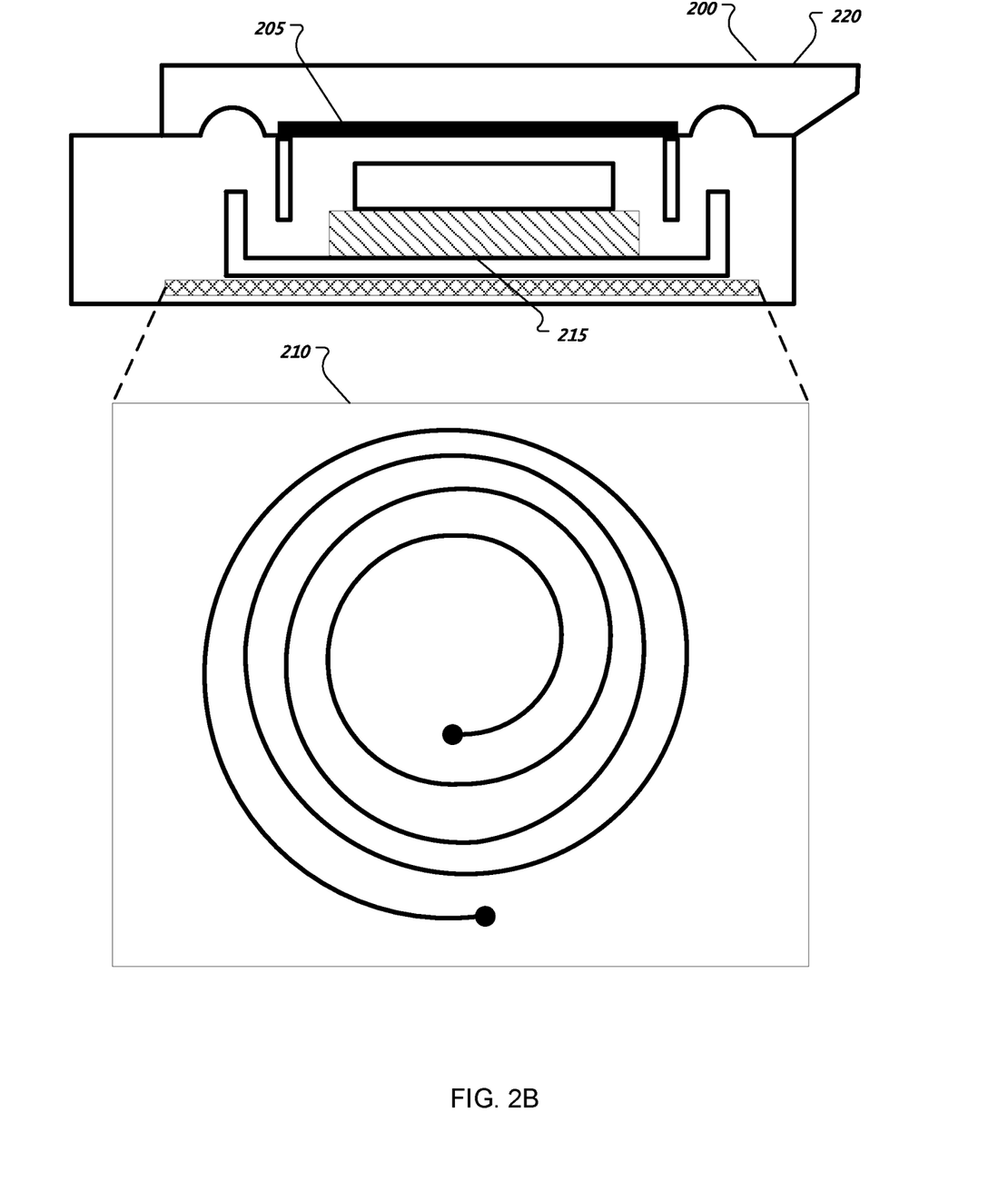

FIGS. 2A-2B are schematic diagrams of a speaker 200 including an excursion measuring component that may implement the disclosed technology. Speakers 200, or audio transducer may be used to implement the disclosed technology. As some background regarding operation of speakers, the speaker 200 can be configured to convert electrical energy into acoustic energy. Many variations of transducers exist, including a moving coil-permanent magnet transducer, which is illustrated in FIGS. 2A-2B. The speaker 200 includes a membrane 205, an excursion measuring component 210, a magnetic system 215, and a diaphragm 220. Also, in FIGS. 2A-2B, the excursion measuring component 210 is shown as a sense coil printed onto a flexible printed circuit (FPC) and attached to the frame of the of the speaker. In FIG. 2A, the speaker 200 is configured with the excursion measurement component 210 on top of the driver. FIG. 2B shows an alternative configuration for speaker 200, which includes the excursion measurement component 210 on the bottom of driver. Whether a system is designed to implement the configuration in FIG. 2B or in FIG. 2B, can be based, at least in part, on the various physical and/or functional aspects of the speaker 200 (e.g., relating to the manufactured product).

In reference to the configuration shown in FIG. 2A, the excursion range can be generally described as the space between the magnetic system 215 and the bottom of the diaphragm 220. Accordingly, the excursion measuring component 210 is placed on top of the diaphragm 220. This design may provide improved accuracy in tracking displacement upwards (+y-axis direction).

In referring to FIG. 2B, the excursion measuring component 220 is positioned on the back of the magnetic system 215. This configuration may have functional constraints, due to placing the sensing coil on the bottom of the magnetic elements of speaker 200. In some cases, a DC magnetic field may interfere with the measurements. In other cases, a bottom metal plate can shield the magnetic field generated by a voice coil of the speaker 200, which, in turn, may negatively impact the inductive coupling to the sense coil. A system using the configuration of FIG. 2B can be designed to account for these and other constraints. The system can be calibrated to subtract a DC component from the electrical signal. For example, a high pass filter can be placed near the ADC path to subtract out the DC component. Additionally, a reference signal can be amplified to compensate for the any experienced shielding.

The speaker 200 includes a voice coil, which can be constructed using a thin wire that is suspended within a magnetic field generated by a magnet. Additionally, the voice coil can be used to function as an electromagnet, as the speaker 200 includes a soft metal core made into a magnet by the passage of electrical current through the voice coil surrounding it, thus creating an electro-magnetic field. The voice coil is configured to move, or rotate, within the magnetic field.

As speaker 200 is actuated, the speaker 200 oscillates and causes the voice coil to also become displaced from the movement. As an example, when an analog signal, which can be an input voltage signal, passes through the coil of the speaker 200, an electro-magnetic field is produced and whose signal strength is determined by the current flowing through coil. The electro-magnetic force produced by the field opposes the main permanent magnetic field around it and tries to push/pull the coil in one direction or the other depending upon the interaction with the magnet.

The coil is attached to the diaphragm 220, which also moves in tandem, and its movement can cause a disturbance in the air around it, thus producing a sound. In the instances where the input signal is a sine wave, then the diaphragm will pulsate (e.g., in and out) which pushes air as it moves, and generates an audible tone, representing the frequency of the signal. The strength, and therefore the velocity, by which the diaphragm 220 moves and pushes the surrounding may be determined at least in part based on the input signal 204 applied to the electromagnet 206.

Being that the voice coil is made of inductive material (e.g., metal wiring), the coil can have inductance and impedance characteristics. Moreover, the magnetic field from the voice coil, which is close proximity with the sense coil can also induce current flow in the sense coil. In instances when the voice coil moves closer to the sense coil, the induced current flow increases, thereby increasing the amplitude of the current signal. In contrast, when the voice coil moves to distances farther from the sense coil, the amplitude of the inducted current flow decreases. Thus, the system monitors the amplitude of the induced current signal, to measure excursion. As an example, the induced current signal can be represented by an oscillating (e.g., sinusoidal) signal having a peak-to-peak amplitude. The system can actively monitor changes in the signal's amplitude while the speaker is driven. Then, any monitored fluctuations in amplitude, such as increases or decreases, can be correlated to a physical distance between the voice coil and the sense coil. Consequently, the system can use a known position of the sense coil to determine a physical position of the voice coil, which is indicative of the excursion distance. Accordingly, the excursion measurement component 210 realizes a solution that provides an actual measurement, rather than an estimation of sensing the excursion of the voice coil, which can improve overall accuracy of the system. In some cases, excursion of other elements of the speaker 200 can be measured using the disclosed techniques, such as diaphragm 220 and membrane 205.

In some embodiments, various calibration techniques can be used to determine a correlation between signal measurements, and active excursion distance measurements. As an example, a calibrating laser is employed to obtain feedback from sense coils during measurements performed on a sample set (e.g., 32 samples). Thus, a direct correlation, or one-to-one relationship, from calibration can be stored in the system to implement the disclosed excursion measurement techniques. In continuing with the example, calibrating can determine that receiving a 1.0 V peak voltage in feedback from the sense coil, correlates to 0.5 mm. Calibration can be performed at the module level to account for assembly and static distance variation from the induction coil to the voice coil. Calibration may need to also be done on the system level to account for ADC variation, which can depend, at least in part, on a required resolution.

Figure 3:
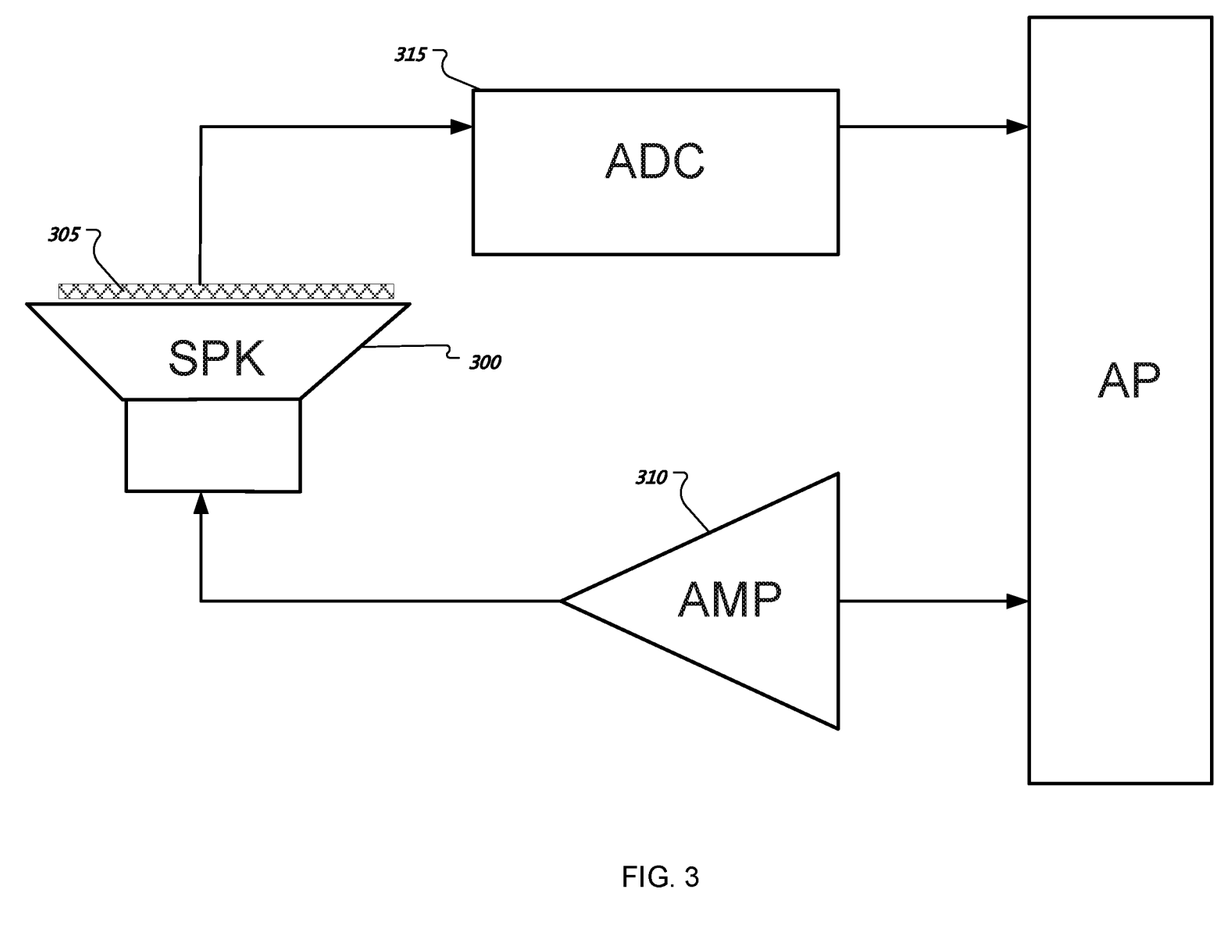
FIG. 3 is a conceptual diagram of a system configured to measure an active excursion distance for an element (e.g., voice coil) of a speaker.

FIG. 3 is a conceptual diagram of a system configured to measure an active excursion distance for an element (e.g., voice coil) of a speaker 300. As shown, the speaker 300 can receive, as input, an electrical signal that has been output from amplifier 310. Additionally, FIG. 3 shows the excursion sensing component 305, which generates an electrical signal in response to inductive coupling. The electrical signal can be an induced current signal propagating through the sense coil, which is then received the analog-to-digital converter (ADC) 310 as input. Subsequently, the induced current signal is analyzed by the system in order to monitor its amplitude. Also, a direct current (DC) component of the electrical signal can be tracked, for example by applying a low pass which averages the electrical signal over tome to detect the DC variation. In some cases, any amplitude variation that may be generated is not considered as the DC component is tracked. DC can be used to determine an absolute resting position for the speaker and the components. For instance, the speaker can be considered at rest when no electrical signal is being provided to the speaker 300.

Moreover, the system is configured to apply an electrical signal at a high frequency (e.g., 21-22 kHz) to an incoming electrical audio signal. Combining the signals can be achieved, as a playback sampling rate can be 48 kHz or higher and the Nyquist frequency can be 24 kHz or higher, for instance at a 16 bit or 24 bit depth. Additionally, the ADC can be clocked at high oversampling to obtain a higher fidelity capture of the coil position. A reference electrical signal is generated as a result of combining the high frequency and audio signal. In instances where the speaker 300 has a small size, for instance in the case of micro-speakers, inductance of the coils is low (e.g., signal with small peak-to-peak amplitude). Employing a reference signal serves to counter drawbacks associated with analyzing a small induced current, and can improve the accuracy of the system.

Figure 4:
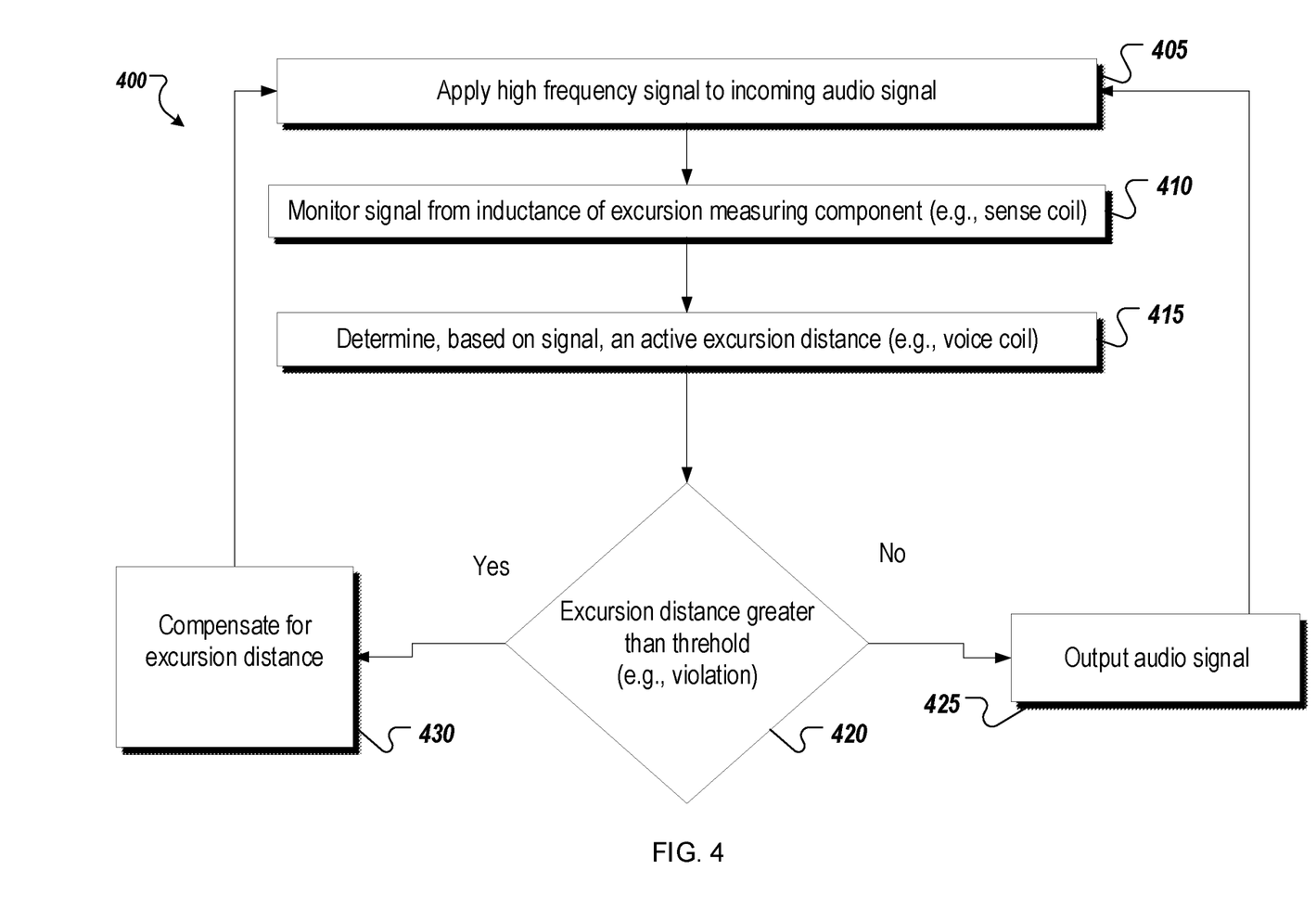
FIG. 4 is a flowchart of an example method for measuring an active excursion distance of an element of a speaker during actuation.

FIG. 4 is a flowchart of an example method for measuring an active excursion distance of an element of a speaker during actuation. The system and techniques described herein may calculate a real-time measurement of the position (and similarly excursion) of the components of a speaker that can be related to an excursion range, including a voice coil, a diaphragm, a magnet, and a membrane. The position measurement is based on electrical parameters monitored while the speaker is reproducing audio, namely monitoring an amplitude of the induced current signal of the sense coil.

The process beings at block 405, where the system applies a high frequency signal to an incoming audio signal. The incoming audio signal can be audio content, such as music, to be reproduced by the speaker. Mixing the incoming audio signal with the high frequency signal results in a reference signal that is further analyzed by the system.

Next, at block 410, the system monitors an electrical signal produced by inducing the excursion measuring component. As disclosed, the system is configured to generate an induced current flow in the sense coil. Subsequently, the system monitors the amplitude of the induced current flow.

Then, at block 415, an active excursion distance, relating to displacement of the voice coil for example, is determined.

The system can determine the active excursion distance of the voice coil using the amplitude of the induced current signal (obtained from monitoring), and a predetermined correlation between physical position and amplitude (previously stored in the system). Next, the system performs a check at block 420. The check determines whether the active excursion distance is greater than a threshold, and can potentially violate any excursion constraints set by the system. For example, the system can compare a measured active excursion distance for the voice coil to a predetermined threshold associated with acceptable excursion. For instance, thresholds can be predetermined distances relating to an excursion range (e.g., ±0.5 mm) where the voice coil, for example, has been observed to move freely (avoiding any unintended contact with other elements/barriers). In cases where the system determines that the voice coil has moved to a distance that reaches or exceeds the threshold (i.e., Yes), the process proceeds to block 430 and performs one or more actions to compensate for the potentially adverse excursion distance.

Alternatively, in cases where the system determines that the voice coil has moved to a distance that is below the threshold (i.e., No), the system can continue to function nominally. In FIG. 4, this is shown as block 425, where the audio signal is output without performing any compensatory actions or signal modifications. FIG. 4 illustrates excursion measuring as an iterative process that repeats measuring the induced current signal at various time intervals (while driving the speaker), so as to achieve continuous and/or real-time excursing sensing.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Further to the descriptions above, a user may be provided with controls allowing the user to make an election as to both if and when systems, programs or features described herein may enable collection of user information (e.g., information about a user's social network, social actions or activities, profession, a user's preferences, or a users current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. An audio speaker system comprising:
   a frame having a surface extending in a plane;
   a flexible printed circuit (FPC) coupled to the surface of the frame, wherein the FPC includes a sense coil;
   a magnet;
   a voice coil defining an axis extending in a first direction non-parallel to the plane and positioned in a magnetic field of the magnet, the voice coil being configured to oscillate along the first direction when the voice coil is energized; and
   an excursion measuring system configured to perform operations comprising:
      determining an electrical parameter of current flow in the sense coil; and
      based on the electrical parameter, determining a distance between the voice coil and the sense coil in the first direction.

2. The system of claim 1, wherein the voice coil is coupled to a membrane and configured to drive the membrane to generate sound waves.

3. The system of claim 2, wherein the voice coil comprises a first end that is coupled to the membrane and a second end that is free from the membrane, wherein determining the distance between the voice coil and the sense coil in the first direction comprises determining a distance between the sense coil and the second end of the voice coil.

4. The system of claim 1, wherein determining the electrical parameter of current flow in the sense coil comprises measuring an amplitude of current flow in the sense coil.

5. The system of claim 1, the operations comprising:
   determining that the distance between the voice coil and the sense coil violates a threshold distance; and
   performing an action to compensate for the distance between the voice coil and the sense coil violates the threshold distance.

6. The system of claim 5, wherein determining that the distance between the voice coil and the sense coil violates the threshold distance comprises determining that the distance between the voice coil and the sense coil exceeds a maximum threshold distance.

7. The system of claim 5, wherein determining that the distance between the voice coil and the sense coil violates the threshold distance comprises determining that the distance between the voice coil and the sense coil is less than a minimum threshold distance.

8. The system of claim 5, wherein performing the action to compensate for the distance between the voice coil and the sense coil violating the threshold distance comprises performing at least one of:
 reducing a gain of an electrical audio signal applied to the voice coil, or
 adjusting audio compression of the electrical audio signal applied to the voice coil.

9. The system of claim 5, wherein the threshold distance is associated with an acceptable excursion range for the audio speaker system.

10. The system of claim 9, wherein:
 the voice coil is configured to oscillate around a center position, and
 the acceptable excursion range is a range measured from the center position.

11. The system of claim 1, wherein the magnet is positioned between the voice coil and the FPC in the first direction.

12. The system of claim 1, wherein the voice coil is positioned between the magnet and the FPC in the first direction.

13. The system of claim 1, wherein the voice coil is energized by applying an alternating current electrical audio signal to the voice coil.

14. The system of claim 13, wherein oscillation of the voice coil induces a current signal in the sense coil.

15. The system of claim 14, further comprising a high pass filter configured to subtract a direct current component from the induced current signal.

16. The system of claim 14, further comprising an analog-to-digital converter that receives the induced current signal as input.

17. The system of claim 16, wherein the analog-to-digital converter is clocked at a sampling rate that is greater than a frequency of the alternating current electrical audio signal.

18. The system of claim 1, the operations further comprising:
 calibrating the FPC to determine a direct correlation between the electrical parameter of the current flow in the sense coil and the distance between the voice coil and the sense coil; and
 storing data related to the direct correlation.

19. The system of claim 18, the operations comprising using the data related to the direct correlation to determine the distance between the voice coil and the sense coil in the first direction.

20. A method for measuring excursion of an audio speaker comprising a magnet and a voice coil positioned in a magnetic field of the magnet, the voice coil defining an axis extending in a first direction, the method comprising:
 energizing the voice coil, wherein the voice coil is configured to oscillate along the first direction when energized;
 determining an electrical parameter of current flow in a sense coil, the sense coil being included in a flexible printed circuit (FPC) coupled to a surface of a frame of the audio speaker, the surface extending in a plane non-parallel to the first direction; and
 based on the electrical parameter, determining a distance between the voice coil and the sense coil in the first direction.

* * * * *